US008566308B2

(12) United States Patent
Musial et al.

(10) Patent No.: US 8,566,308 B2
(45) Date of Patent: Oct. 22, 2013

(54) INTELLIGENT ADAPTIVE INDEX DENSITY IN A DATABASE MANAGEMENT SYSTEM

(75) Inventors: John G. Musial, Newburgh, NY (US); Abhinay R. Nagpal, Pune (IN); Sandeep R. Patil, Somers, NY (US); Yan W. Stein, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 13/014,103

(22) Filed: Jan. 26, 2011

(65) Prior Publication Data

US 2012/0191702 A1    Jul. 26, 2012

(51) Int. Cl.
    *G06F 17/30*    (2006.01)
(52) U.S. Cl.
    USPC ........................................................ 707/719
(58) Field of Classification Search
    USPC ........................................................ 707/719
    See application file for complete search history.

(56) References Cited

U.S. PATENT DOCUMENTS

| 2006/0184338 | A1 | 8/2006 | Lightstone et al. |
| 2007/0136386 | A1 | 6/2007 | Burger |
| 2008/0263001 | A1 | 10/2008 | Lohman et al. |
| 2009/0144303 | A1 | 6/2009 | Bhide et al. |
| 2009/0287637 | A1 | 11/2009 | Day et al. |

OTHER PUBLICATIONS

"Catalog Statistics Tables", International Business Machines Corporation, [online]; [retrieved on Jan. 25, 2011]; retrieved from the Internet http://publib.boulder.ibm.com/infocenter/db2luw/v8/index.jsp?topic=/com.ibm.db2.udb.doc/admin/c0005087.htm, 6 pages.
Kristine P. Bennett et al., "Density-Based Indexing for Approximate Nearest-Neighbor Queries", Microsoft Research, Oct. 28, 1998.
"Table Partitioning and Multidimensional Clustering Tables", International Business Machines Corporation, [online]; [retrieved on Jan. 25, 2011]; retrieved from the Internet http://publib.boulder.ibm.com/infocenter/db2luw/v9/index.jsp?topic=/com.ibm.db2.udb.admin.doc/doc/c0021605.htm, 5 pages.

*Primary Examiner* — Huawen Peng
(74) *Attorney, Agent, or Firm* — Cantor Colburn LLP; Dwayne Nelson

(57) ABSTRACT

Adaptive index density in a database management system is provided, which includes receiving a number of partitions for an index for a database table, the index subject to creation. The adaptive index density also includes selecting a column from the database table, the column selected based upon an estimated frequency of execution of database queries for the column. The adaptive index density further includes calculating an estimated cost of executing each of the database queries for the column, and determining data to reside in each of the partitions of the index responsive to the estimated cost.

6 Claims, 5 Drawing Sheets

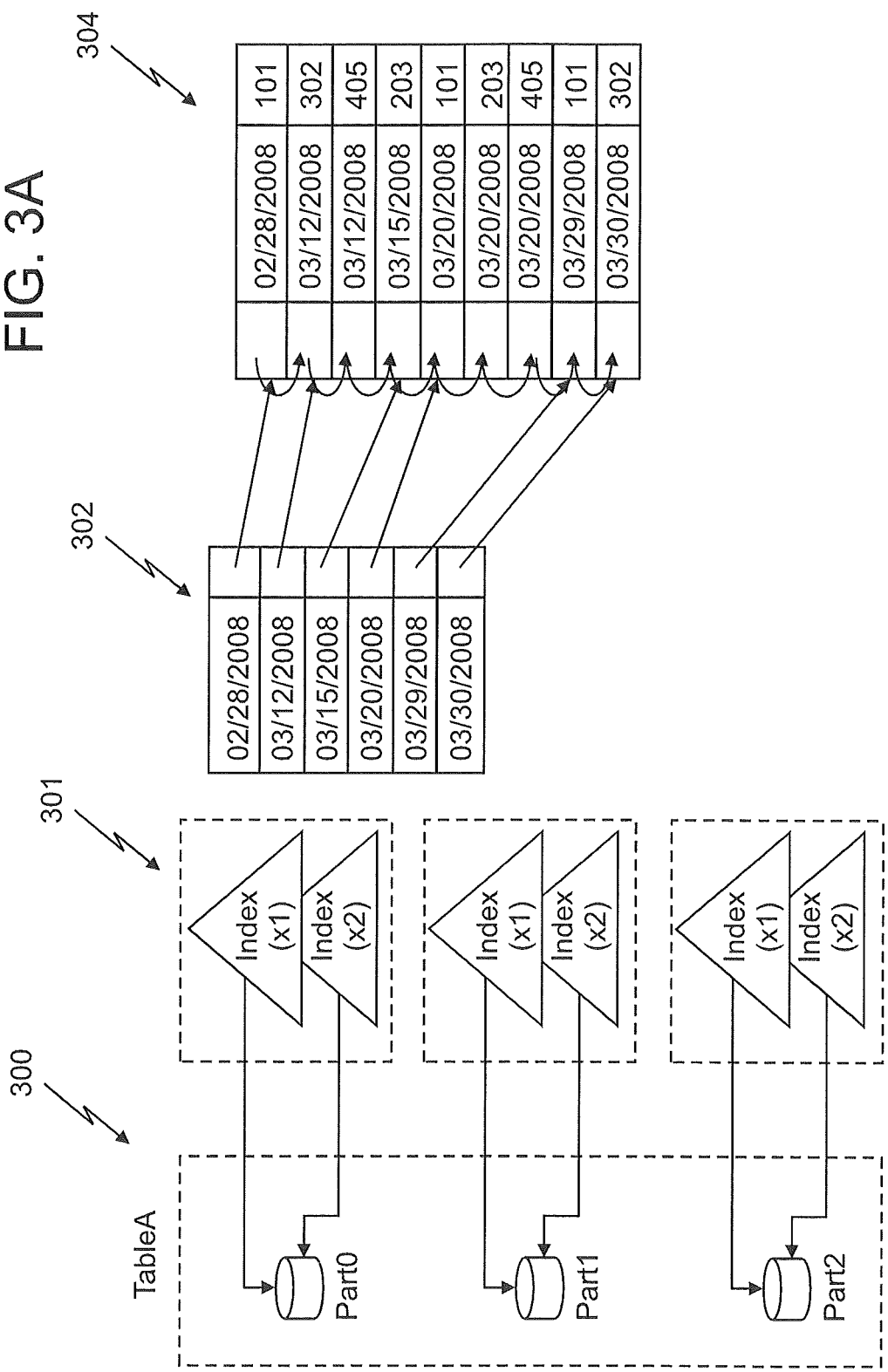

INTELLIGENT ADAPTIVE INDEX DENSITY IN A DATABASE MANAGEMENT SYSTEM

BACKGROUND

The present invention relates to database table indexing, and more specifically, to intelligent, adaptive index density in a database management system.

A database index is a data structure that improves the speed of data retrieval operations on a database table at the cost of slower writes and increased storage space. An index can be created using one or more columns of a database table, providing the basis for both rapid random look ups and efficient access of ordered records.

The density of an index measures the uniqueness of values within a data set. Density is determined by dividing the number of rows that correspond to a given key by the number of rows in the table. Indices may be classified as ordered indices which fall into two types: dense and sparse. In a dense index, an index record appears for every search key value in file. This index record contains the search key value and a pointer to the actual record. In a sparse index, index records are created only for select records. To locate a record, an index record having the largest search key value less than or equal to the search key value that is being looked for is searched. The record pointed to by the index record is the beginning location, and the pointers in the file are examined (sequentially) until the desired record is found.

Dense indices are faster in general, but sparse indices require less space and impose less maintenance for insertions and deletions. Further, having many dense indices will consume a lot of main memory and is costly in terms of bringing a block into main memory (i.e., more dense indices may not fit into limited space in main memory resulting in swapping data between memory and disk, whereas sparse indices tend to be smaller and so may be able to fit all its data into memory).

Access patterns for indices may be classified as clustered (i.e., sequential access patterns) and unclustered (i.e., random access patterns). An unclustered index is structured in a way that does not correspond to the order of the actual data records. It resembles the words index at the back of a book. For this reason, it typically does not perform as well as clustered indices on ranged searches where the result set is large, since each result might cost an additional input/output (I/O)-operation to get the actual data record.

Clustering alters the data block into a certain order to match the index; hence, it is also an operation on the data storage blocks as well as on the index. An address book ordered by first name resembles a clustered index in its structure and purpose. The exact operation of database systems varies, but because storing data is very redundant, the row data can only be stored in one order. Therefore, only one clustered index can be created on a given database table. Clustered indices can greatly increase overall speed of retrieval, but usually only where the data is accessed sequentially in the same or reverse order of the clustered index, or when a range of items are selected.

Since the physical records are in this sort order on disk, the next row item in the sequence is immediately before or after the previous one, and so fewer data block reads are needed. The primary feature of a clustered index is therefore the ordering of the physical data rows in accordance with the index blocks that point to them. Some databases separate the data and index blocks into separate files, others put two completely different data blocks within the same physical file(s).

Current storage disk technologies provide two types of hybrid disks: solid state disks (SDDs) and hard disk drives (HDDs). Solid state disks and other devices based on NAND flash memory allow many more random I/Os per second than conventional magnetic disks. Thus, in principle, they can support workloads involving random I/Os much more effectively. However, flash memory does not support general in-place updates. Instead, a whole data page is written to a new area of the device, and the old page must be invalidated. Groups of contiguous pages form erase units, and an invalidated page becomes writeable again only after the whole erase unit has been cleared. Erase times are relatively high. Flash-based memory does, however, allow in-place changes of 1-bits to 0-bits without an erase cycle. Thus, it is possible to reserve a region of flash memory initialized to all 1s, and incrementally use it in a write-once fashion.

A solid-state drive (SSD) is a data storage device that uses solid-state memory to store persistent data. SSDs are external storage devices designed on the basis of semiconductor memory. One advantage of SSD is that it does not contain any mechanical moving parts, in contrast to HDD which has moving parts. Other advantages of SSD over HDD include the access time of the SSD is much faster, the read speed of the SSD is higher, the SSD is lighter in weight, and the power consumption of SSD is typically lower.

As indicated above, dense indices are faster in general, but sparse indices require less space and impose less maintenance for insertions and deletions. Further, having many dense indices will consume a lot of main memory and is associated with high costs in terms of bringing a block into main memory. Recent memory management systems have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally defined tables consisting of rows and columns, and which are typically accessed using a standardized language such as Structured Query Language (SQL), has substantially improved processing efficiency, as well as simplified the creation, organization, and extension of information within a database. Furthermore, significant development efforts have been directed toward query "optimization," whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still desirable.

SUMMARY

A system for adaptive index density in a database management system is provided. The system includes a computer processor device and logic executable by the computer processor. The logic implements a method. The method includes receiving a number of partitions for an index for a database table. The index is subject to creation. The method also includes selecting a column from the database table, the column selected based upon an estimated frequency of execution of database queries for the column. The method further includes calculating an estimated cost of executing each of the database queries for the column, and determining data to reside in each of the partitions of the index responsive to the estimated cost.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

FIG. 3A depicts indices prior to partitioning by the adaptive index density processes.

DETAILED DESCRIPTION

Figure 1:
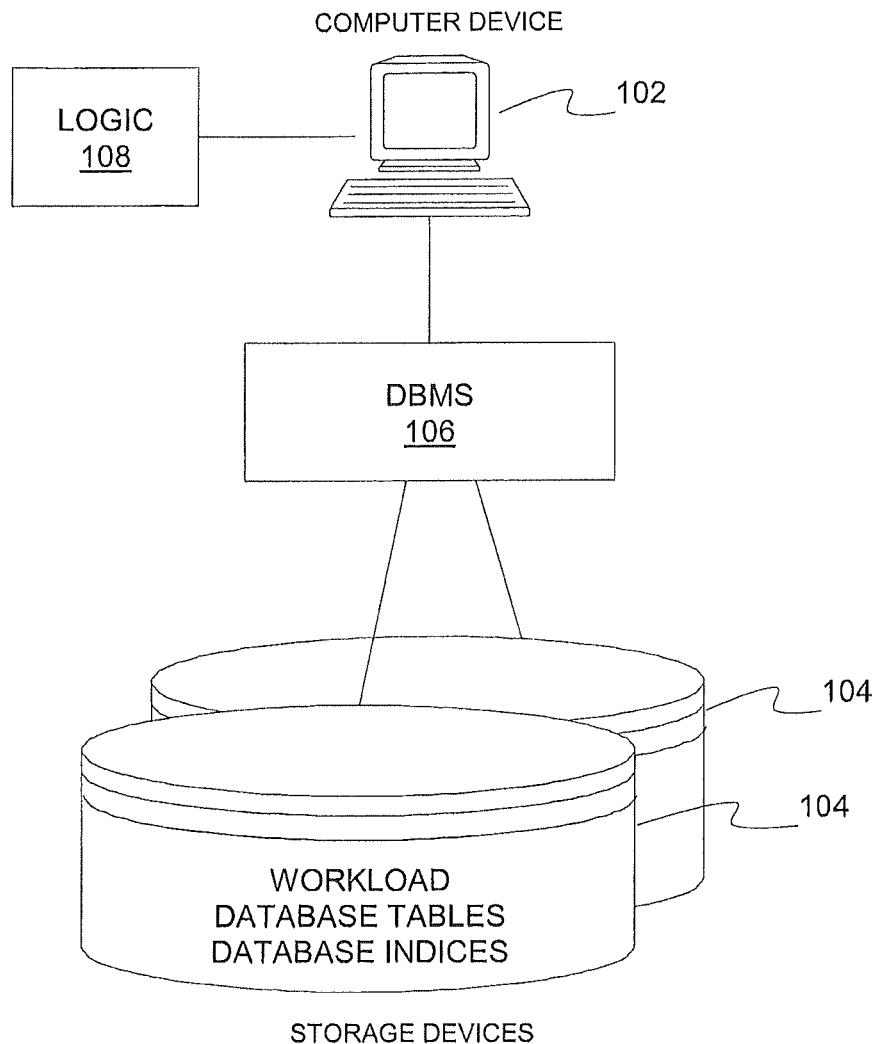
FIG. 1 depicts a block diagram of a system upon which adaptive index density for a database may be implemented in an exemplary embodiment.

In an exemplary embodiment, the adaptive index density processes for a database are provided. The exemplary embodiments determine a density of an index defined over a file or a database table by considering the characteristics of the underlying storage and a workload input. By doing so, an optimal index density is obtained and subsequently the index is rebuilt.

The adaptive index density processes analyze the workload in a database or a file system and determine an index density such that I/O performance is maximized. While doing so, an index defined over data with high read affinity is partitioned and is allocated a greater density, whereas an index defined over low read affinity data is partitioned and is allocated a lower density.

In an exemplary embodiment, the adaptive index density processes estimate the costs of each query in the workload using query cost techniques. In a further exemplary embodiment, the adaptive index density processes is configured to provide a user with the ability to specify maximum and minimum number of partitions/tables for analysis and optimization by the adaptive index processes. In an additional exemplary embodiment, the adaptive index density processes may be configured to provide a user with the ability to provide hints to the adaptive index processes in order to model future changes of the data in a workload.

The adaptive index density processes receive a data query over at least one range of rows in a database table, and analyze the sequential and random access involved to fulfill the query and subsequently determine the underlying storage over which the tables reside. In case of random access over a hard disk driver (HDD), the adaptive index density processes generate an index with a high density for the index referenced in the database query, and in case of sequential access over a hard disk driver (HDD) the adaptive index density processes generates an index with a low density for the index referenced in the database query. In case of random access over a Solid state disk (SSD), the adaptive index density processes generate an index with a low density for the index referenced in the database query, and in case of sequential access over a Solid State disk (SSD) the adaptive index density processes generate an index with a high density for the index referenced in the database query. The exemplary adaptive index density processes may include a facility that periodically runs read/write tests on the disks to identify and periodically reconfirm the disk characteristics in determining read/write affinity. The type and technology of a given disk may be identified using CIM interfaces provided by a disk vendor.

The adaptive index processes provide improvement in read/write operation performance, enable more efficient usage of available system resources, provide faster access to data, and result in lower overall power consumption. Additionally, performance-intensive systems such as those using telecommunications databases would not experience degradation during an index rebuild process.

Turning now to FIG. 1, an exemplary system 100 upon which the adaptive index processes may be implemented will now be described. The system 100 of FIG. 1 includes a computer device 102 in communication with storage devices 104 via a database management system 106 that is implemented by the computer device 102. The computer device 102 may be implemented using a general-purpose computer executing a computer program for carrying out the processes described herein. The computer device 102 may be a personal computer (e.g., a lap top, a personal digital assistant) or host-attached terminal.

The storage devices 104 include data repositories with data relating to the daily operations of an enterprise, as well as data used in implementing the adaptive index density processes described herein. The storage devices 104 may be implemented using a variety of devices for storing electronic information. It is understood that the storage devices 104 may be implemented using memory contained in the computer device 102 or that it may be a separate physical device (e.g., as shown in FIG. 1). Information stored in the storage devices 104 may be retrieved and manipulated via the computer device 102. In an exemplary embodiment, storage devices 104 store workloads, database tables, and database indices for the database tables.

The computer device 102 implements logic 108 for performing the adaptive index processes described herein. The logic 108 may be a standalone software application that communicates with the database management system 106, e.g., via an application programming interface (API), or may be integrated into a single product with the database management system 106.

As indicated above, the exemplary adaptive index density processes determine a density of an index defined over a file or a database table by considering the characteristics of the underlying storage and a workload input. By doing so, an optimal index density is obtained and subsequently the index is rebuilt.

The processes include determining candidate indices over tables and attributes within them. The processes further include allocating the chosen density for each index selected during the first step to the partition. It is noted that the adaptive index density processes described herein assume that all partitions have the same characteristics. However, those skilled in the art will appreciate that the proposed adaptive index density processes may be extended to partitions that do not have the same characteristics by giving weight to the different partitions to map their characteristics.

The exemplary adaptive index density processes receive inputs including a workload specification that details specific queries and the frequency of execution of each, as well as a range for the number of partitions to be created (i.e., k=the range of the number of partitions to be created). The adaptive index density processes generate from these inputs a set of tables and the optimal partitions for each table selected. In particular, the processes provide a model for detecting candidate tables, columns, and ranges for a database and workload.

Figure 2:
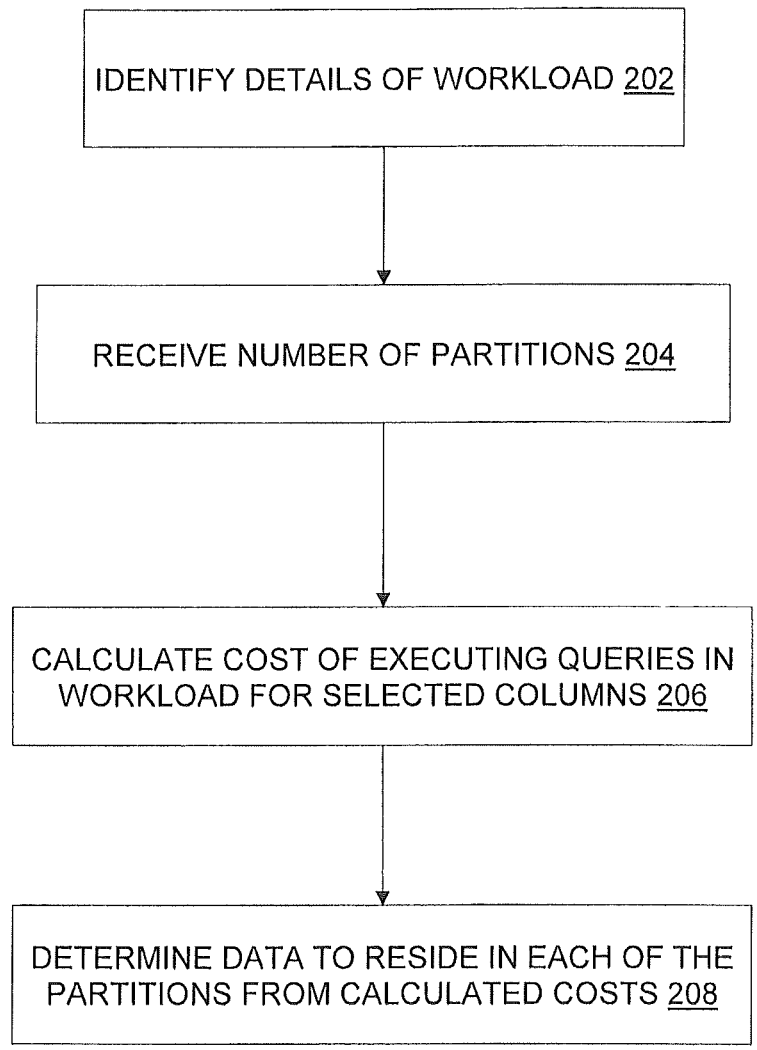
FIG. 2 illustrates a flow diagram describing a process for implementing adaptive index density for a database in an exemplary embodiment.

Turning now to FIG. 2, a process for implementing the adaptive index density will now be described in an exemplary embodiment. At step 202, the logic 108 identifies the details of a workload. This step includes column pruning for candidate columns. For a given database, the logic 108 finds columns for which the database tables can be partitioned. A column takes a value in a pre-defined domain such as: date, time, timestamp, integer, decimal, smallint, or varchar. Other data types may be used in implementing the adaptive index density. The above-listed data types are provided for illustrative purposes and are not meant to be limiting in scope.

The set of columns selected using the above two criterion is denoted by $D_i$. For example:

$D_i$=[Table-A (Z, Y), Table-B (W), Table-C (U, Y, I)]

Once the data columns have been pruned as described above, a frequency estimation of occurrence is calculated. For a given workload, a QRM (query reference matrix) is constructed. Using the QRM, candidate columns are based on frequency of occurrence of the columns in, e.g., RANGE, IN, BETWEEN, GROUP BY, ORDER BY, WHERE (EQUALITY e.g., REGION='NW' or NONEQUALITY) predicates of the workload. For each table, the top three columns are selected based on the frequency of occurrence of the column in any of the above specified predicates. The number 'three' is provided here for purposes of illustration. It will be understood that fewer or more columns may be selected. The selected column set for the entire database is denoted as $W_j$. For example:

$W_j$= [Table-A (Z)#N @Usage$_A$,
Table-B (W, T)#M @Usage$_B$,
Table-C (U, Y)#M @Usage$_C$,
Table-D (T, R)#O @Usage$_D$
] where

N denotes the number of times column Z is accessed in Table A in either a RANGE, IN, BETWEEN, EQUALITY, NONEQUALITY, GROUP BY, or ORDER BY predicate, and @Usage$_A$ denotes the usage of column Z in queries, such as Z='23', Z=BETWEEN '23' AND '50', etc.

The logic 108 then finds the columns which are common between $D_i$ and $W_j$:

$C_k$=$D_i$ ∩ $W_j$=[Table-A (Z), Table-B (W), Table-C (U, y)]

A final column selection for each database table is then made by the logic 108 (i.e., if there are multiple columns for a single table in the set $C_k$, they are pruned down to a single column). By selecting a single column of each table for data partitioning, memory space is conserved and query efficiency may be optimized. A column which takes part in a join with another table is used more frequently as compared to other columns. Hence, such a column is given the first preference in the final column selection process. If there is no such column, then the column selection may be based on the frequency of use of the column. Hence, the criterion for performing the final column selection may be summarized as:

For each table, the column used in a join with another table is selected. If there is no such column, then the column with the highest frequency value (i.e., #N value) in the QRM is selected. The table is partitioned using this column. The final column set is denoted as $F_k$.

In one embodiment of the invention, multiple columns may be selected per table and the table pruning process described above may be implemented for each of the columns. The column having the least cost for the best partition on the given workload may be chosen for doing the partitioning. The decision of choosing a single column per table or multiple columns per table may be made by a database administrator of the system 100 of FIG. 1 and may be dependent on the size of the table.

At step 204, the logic 108 receives the desired number of partitions, which may be input by a user or database administrator, e.g., via the computer device 102 of FIG. 1. Once the column of each table for which the partitioning will be performed (as well as the number of partitions) is selected, the logic 108 calculates the cost of executing each query in the workload at step 206. Each partition can be represented using ranges or by the distinct values which constitute each range.

The optimal ranges may be determined using a Dynamic Programming based method. In this method the goal is to find the optimal partitions for storing data such that the cost of executing the query workload is minimized. The cost of executing a query workload is defined as the number of rows that need to be accessed by all the queries constituting the workload. It is important to note that if a query accesses two partitions, then the query is assumed to access all the rows of the two partitions. This might not necessarily be true (if there are additional indices for a partition); however the worst case scenario is described herein in order to derive the best partition.

A recursive exhaustive search approach may be used. If the recurrence relation of the algorithm is evaluated without storing partial results, then the algorithm will spend exponential time. Hence, the partial results are stored to speed up the execution, and the new dynamic programming based algorithm requires $O(n^2k)$ can you make this form as n-square time. Recall that 'k' is generally a small number and hence executing this algorithm (which is a one time activity) is very efficient and practical. The algorithm is given below:

```
j=1;
For (j< |F_k|)
    e_i = F_k[j]
    DiscoveryPartitions(e_columns, e_table, workload)
    j++;
End For
DiscoveryPartitions (column, table, workload)
    If TypeOfColumn(columns)=='VARCHAR'
        Find-Buckets-For-Column(TableName,ColumnNamne,Workload)
returns Buckets
    If TypeOfColumn(columns)=='DATE'
        Find-Buckets-For-Column(TableName,ColumnName,Workload)
returns Buckets
        Find-Fixed-Buckets(TableName, ColumnName, Workload) returns
        //database administrator selects the best of the two approaches
    If TypeOfColumn(columns)=='NUMERIC'
        Find-Buckets-For-Column(TableName,ColumnName,Workload)
```

-continued

```
returns Buckets
end
Find-Buckets-For-Column(TableName, ColumnName, Workload)
    FindCells (TableName, ColumnName, Workload);
    Create array CELL_SIZE which has number of rows in each cell;
    Create upper triangular matrix A
    /*A has the number of rows in every possible partition of the
array.*/
        A[1,1] = CELL_SIZE[1];
        For i=2 to N;
            A[1,i]=[A[1,i−1]+CELL_SIZE[i];
        End For
        For i=2 to N;
            For j= i to N;
                A[i,j]=A[1,j]−A[1,i−1];
            End for;
        End for;
    Create upper triangular matrix B
    /*B computes the number of queries that access a given partition*/
    B is computed by examining the workload and based on partition
size.
    Compute COST matrix as:
        For i= 1 to N;
            For j= i to N;
                COST[i,j]=A[i,j]*B[i,j];
            End for
        End for
Solve the following recurrence relation:
Let M[n,k] be the smaller possible cost
    M[n,k]= min_{i=1}^{N} [sum(M[i,k−1],COST(i+1,N))]
    M[1,k]=s_1
```

$$M[n, 1] = \sum_{i=1}^{n} s_i$$

```
end
FindCells (TableName, ColumnName, IndexName, Workload)
    Find minimum and maximum value of column;
    Analyze workload and find all boundaries for this column (e.g., select
. . . where C1>10; 10 is one boundary);
        Sort boundaries in increasing order;
        Boundaries define the different cells in the column;
End
```

If given a range of k values, the recurrence relation may be run for different values of k. During one iteration of k, the values of M[n,k] stored during the previous iteration may be reused. Thus, the evaluation for different values of k will not be very expensive. The partition k value which offers the least cost from the range of k values given is chosen as the input.

M[n,k] is the cost of the best partition and the partition is given as a by-product of the recurrence relation. An extra constraint may be used specifying that the size of the partition should not be greater than some percentage of the total size of the column so as to ensure even distribution of partitions. For example:

Find-Fixed-Buckets(TableName, ColumnName, Workload):
$P_1$=Partitions generated on daily basis;
$C_1$=Cost of workload for $P_1$;
$P_2$=Partitions generated on weekly basis;
$C_2$=Cost of workload for $P_2$;
$P_3$=Partitions generated on monthly basis;
$C_3$=Cost of workload for $P_3$;
$P_4$=Partitions generated on quarterly basis;
$C_4$=Cost of workload for $P_4$;
$P_5$=Partitions generated on yearly basis;
$C_5$=Cost of workload for $P_5$;
Best Cost=min($C_1,C_2,C_3,C_4,C_5$);
Return partition with best cost;
/*more partition types can be used based on input from database administrator*/end The above described algorithm first analyzes the query workload to find the various boundaries of the column under investigation. A boundary is a value of the column which is used as a boundary of a query e.g., Date <Feb. 9, 2001.In this case, Feb. 9, 2001 is a boundary. If there are no boundaries, then either all the distinct values in the cell (if that is small) may be used or the column may be divided into a fixed number of cells of equal size (if it is of a numeric or date data type). The boundaries divide the column into regions which are referred to herein as 'cells.'

The CELL_SIZE array has N elements (where N is the number of cells in the column). The CELL_SIZE[i] entry stores the size of the ith cell in the column. This can be easily found using from the statistics collected by the query optimizer. The upper triangular matrix A stores the number of rows in the different sub-sets of cells. An entry A[i,j] represents the number of rows present in a partition formed of cells i to j.

The upper triangular matrix B stores the number of queries in the workload that access a given partition formed by combining cells. If a query with frequency L accesses the partition then it is considered to be L separate queries accessing the partition.

The COST matrix described above computes the cost of executing the given workload for a given partition formed by merging cells. As indicated above, if a query accesses a partition, then it is assumed to access all the rows in the partition. Hence the cost of a partition is given by multiplying the respective entries in matrices A and B. It will be understood by those skilled in the art that various techniques may be used to compute the cost. The method described herein is one instantiation of finding the cost and is provided herein for purposes of illustration.

The recurrence relation is used to compute the best partition and its cost. The relation uses the COST matrix and it avoids repetitive computation of the same value.

For the 'Date' data type, the cost of using fixed size buckets is also computed. This allows for the selection of buckets which can be repetitive. This may be useful in cases where the data changes over time.

Once the cost of executing each query in the workload has been calculated, the logic 108 determines the actual data that will reside in each partition so that execution of the workload is optimized at step 208.

The density of the index may be represented using any value that varies based upon the relative number of records matching a certain criteria within a particular range of records. While the relative record number (RRN) degree value decreases as the number of records in a range increases and/or the size of the range decreases, other values indicative of density may use an inverse representation of density, e.g., by dividing the count by the size of the range so that the value increases as the number of records in a range increases and/or the size of the range decreases.

Consider an example in which cost estimates for a file having a number B of data blocks is evaluated. The example assumes an average time D to read/write (R/W) a block and has a number of records R per block. Suppose also an index record that is one tenth (1/10) the size of the associated database table and that a search key (=sort attribute) is a candidate key.

The cost search for unique values using a dense index is shown as follows:

The number of data blocks B is divided by 10, so there is B/10 blocks in the index file (assuming the file block size is fixed for all files). A binary search cost is calculated as D log 2(B/10), and the total cost is calculated as D log(B/10)+D (includes data block access).

To calculate the cost for a sparse index (assuming again there are B data blocks in a file with an average time D to R/W a block and R records per block), the cost search for unique values using a sparse index is shown as follows:

The number B of data blocks in the data file is greater than or equal to B entries in the index file;

The number of records per block (R) is multiplied by 10 (10*R), where 10R index records per file block is greater than or equal to B/(10R) index blocks. The binary search cost is calculated as D log 2(B/(10R)), and the total cost is calculates as D log 2(B/(10R))+D (includes data block access).

To schedule the I/Os based on the partitions with the lowest RRN degree(s) (i.e., high density), a value representative of the maximum number of rows that can be retrieved with a single I/O (i.e., maximum number of bits in a region) may be calculated as follows:

value representative of the maximum number of rows that can be retrieved with a single I/0=a maximum hardware number of bytes per I/O divided by an average table row size;

This value may be referred to as MaxRowsIO and may be calculated as follows:

MaxRowsIO=a maximum hardware number of bytes per I/O divided by an average table row size;

The general set up of a constrained maximization problem is to choose the levels of one or more variables, [x1, x2, ..., xn] in order maximize the value of a function f [x1, x2, ..., xn] subject to some constraints g1 [x1, x2, ..., xn]. The function f is referred to herein as the objective function, and the set of values of the variables that satisfies the constraints is called the feasible set.

Thus, the variables to be maximized are represented as: f(x) (amount of index lookups versus disk lookups), and f(y) (amount of USER CPU versus I/O Time). The constraints may be represented as: g(x) (total memory available for index), g(y) (time for index rebuild), and g(x,y) (the constraint function).

Consider the optimization problem f(x,y) subject to g(x,y)=c. To determine critical points, the following first order condition may be used:

$$f_{x_1} = \frac{\partial f(x_1^* x_2^*)}{\partial x_1} = 0$$
$$f_{x_2} = \frac{\partial f(x_1^* x_2^*)}{\partial x_2} = 0$$

This problem can be solved using methods such as Newton's methods and/or Lagrange multipliers (e.g., finding the extreme values of $f(x_1, x_2, \ldots, x_n)$ when the point $(x_1, x_2, \ldots, x_n)$ is restricted to lie on the surface $g(x_1, x_2, \ldots, x_n)=k$). Using multivariable calculus, the gradient of a function h is a normal vector to a curve (in two dimensions) or a surface (in higher dimensions) on which h is constant. The length of the normal vector does not matter; that is, any constant multiple of a gradient is also a normal vector, the unknown constant multiplier λ is used because the magnitudes of the two gradients may be different.

The first step in trying to reduce (P) to a set of equations is to construct a new function, the Lagrangian, which involves the original variables x, and a new set of variables, one for each constraint. One role in the analysis applies the concept of a saddle-point of the Lagrangian function. A saddle-point is a pair of vectors (x*,y*), such that x* maximizes the Lagrangian L(x, λ*).

It is desirable to be able to convert the saddle-point condition into a set of equations, whose solutions characterize the saddle-point. The value of $f(x_1, x_2, \ldots, x_n)$ is maximized when surface's gradient vectors at that point are parallel: $\nabla f(x_1, x_2, \ldots, x_n) = \partial \nabla g(x_1, x_2, \ldots, x_n)$. The number λ. in the equation is known as the Lagrange multiplier.

Figure 3B:
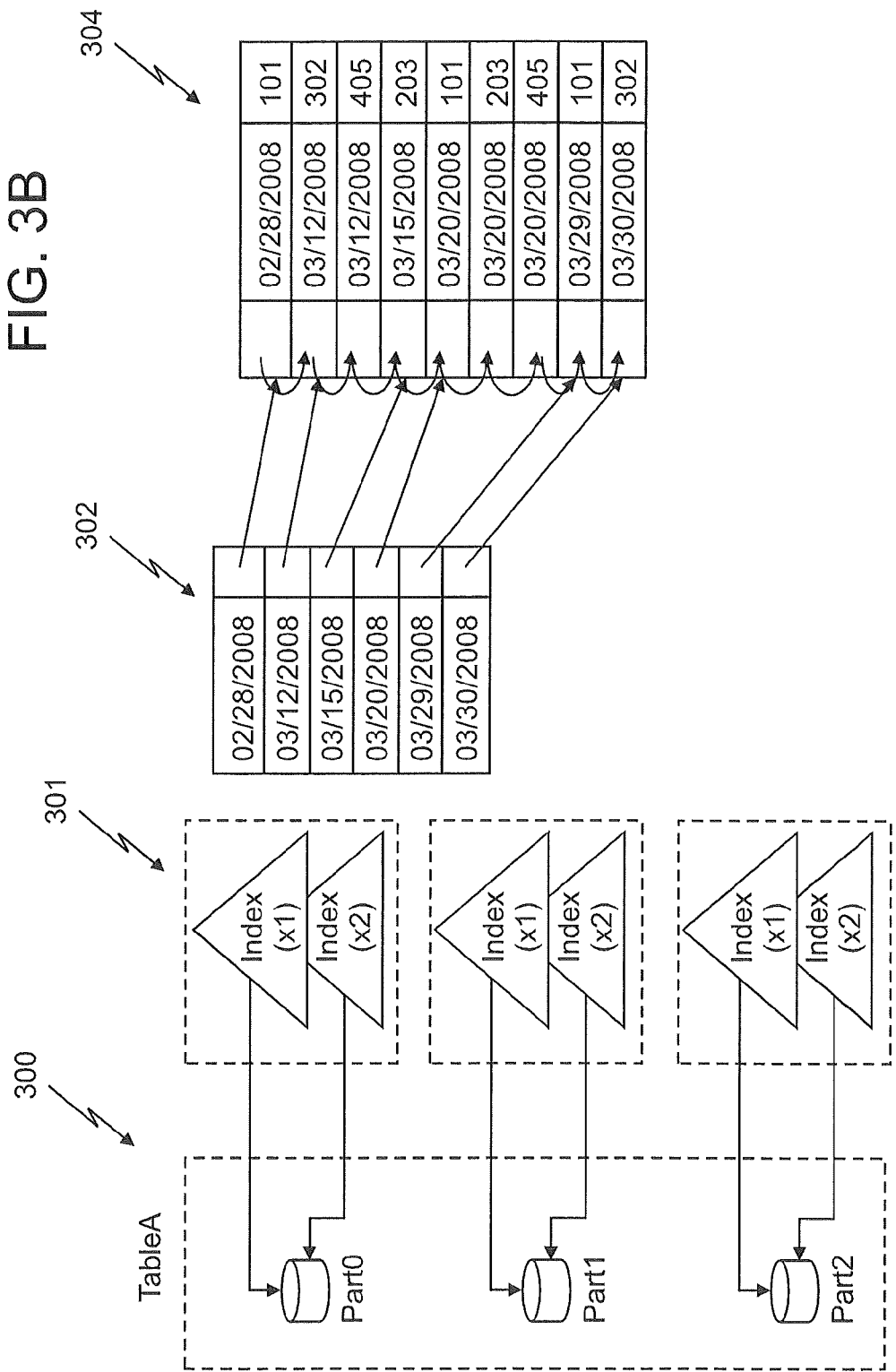
FIG. 3B depicts the indices of FIG. 3A after partitioning by the adaptive index density for database processes in an exemplary embodiment.
Figure 3C:
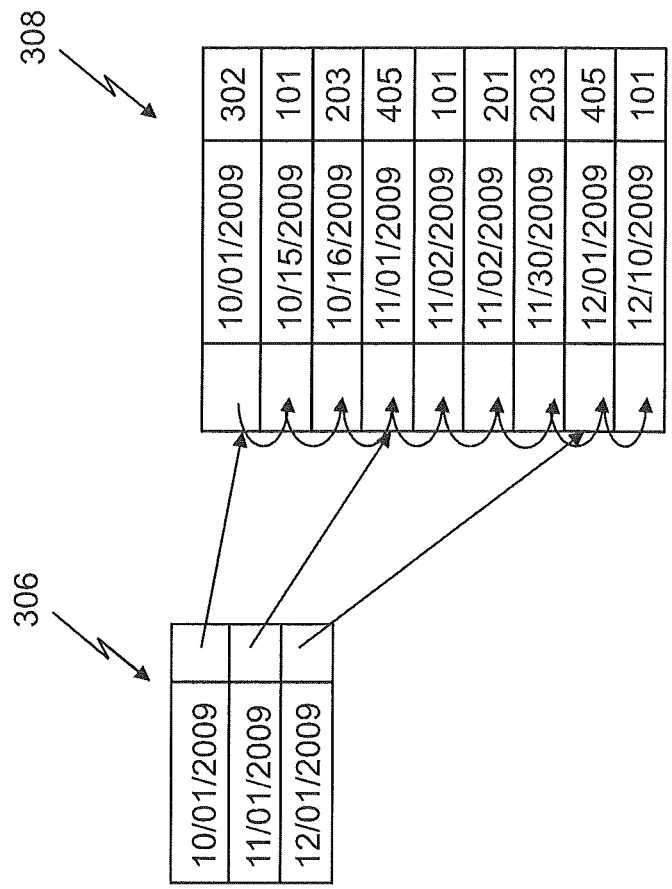
FIG. 3C illustrates a sparse index and database table generated after the exemplary adaptive index density processes have been implemented.

FIG. 3A illustrates a partitioned table 300 with partitioned indices 301. The indices 301 are shown prior to partitioning by the exemplary adaptive index density processes. FIG. 3B illustrates a dense index 302 and database table 304 and FIG. 3C illustrates a sparse index 306 and database table 308 generated after the exemplary adaptive index density processes have been implemented.

For a partitioned table, prior to the adaptive index density processes, all of the partitioned indices are dense indices (e.g., shown as index 302 in FIG. 3A). However, once the adaptive index density processes have been implemented, some of these partitioned indices are kept in dense format, while others are re-built as sparse indices, as shown in FIG. 3B (e.g., index 306).

The indices 302 and 306 may be generated using the sample table/index definition below:

```
CREATE TABLE PARTS (
PartID INT NOT NULL,
shipdate DATE)
PARTITION BY RANGE(shipdate)
(STARTING ('1/1/2008') ENDING ('12/31/2009') EVERY MONTH);
CREATE INDEX partShipIdx on PARTS (shipdate) PARTITIONED.
```

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for providing adaptive index density in a database management system, the system comprising:
a computer processing device; and
logic executable by the computer processing device, the logic implementing a method, the method comprising:
receiving a number of partitions for an index for at least one database table, the index subject to creation;
selecting a column from the at least one database table, the column selected based upon an estimated frequency of execution of database queries for the column;
calculating an estimated cost of executing each of the database queries for the column;
determining data to reside in each of the partitions of the index responsive to the estimated cost; and
determining data read affinity of a workload for the database table and specifying data having a read affinity exceeding a specified threshold as a high read affinity;
wherein determining data to reside in each of the partitions responsive to the estimated cost includes partitioning the index subject to creation for data having the high read affinity with a high density, and partitioning the index for data having the low read affinity with low density.

2. The system of claim 1, wherein the method further comprises:
- analyzing sequential and random accesses to execute the database queries;
- determining storage in which database tables associated with the database queries resides;
- upon determining a database query uses random access over a hard disk drive, generating the index with a high density for an existing index referenced in the database query.

3. The system of claim 1, wherein the method further comprises:
- analyzing sequential and random accesses to execute the database queries;
- determining storage in which database tables associated with the database queries resides;
- upon determining a database query uses sequential access over a hard disk drive, generating the index with a low density for an existing index referenced in the database query.

4. The system of claim 1, wherein the method further comprises:
- analyzing sequential and random accesses to execute the database queries;
- determining storage in which database tables associated with the database queries resides;
- upon determining a database query uses random access over a solid state disk drive, generating the index with a low density for an existing index referenced in the database query.

5. The system of claim 1, wherein the method further comprises:
- analyzing sequential and random accesses to execute the database queries;
- determining storage in which database tables associated with the database queries resides;
- upon determining a database query uses sequential access over a solid state disk drive, generating the index with a high density for an existing index referenced in the database query.

6. The system of claim 1, wherein the column is further selected based upon a data type of the column, the data type comprising at least one of:
- a date, time, timestamp, integer, decimal, smallint, and varchar.

* * * * *